R. Haskell,
Fish Hook,
N° 25,507.   Patented Sept. 20, 1859.
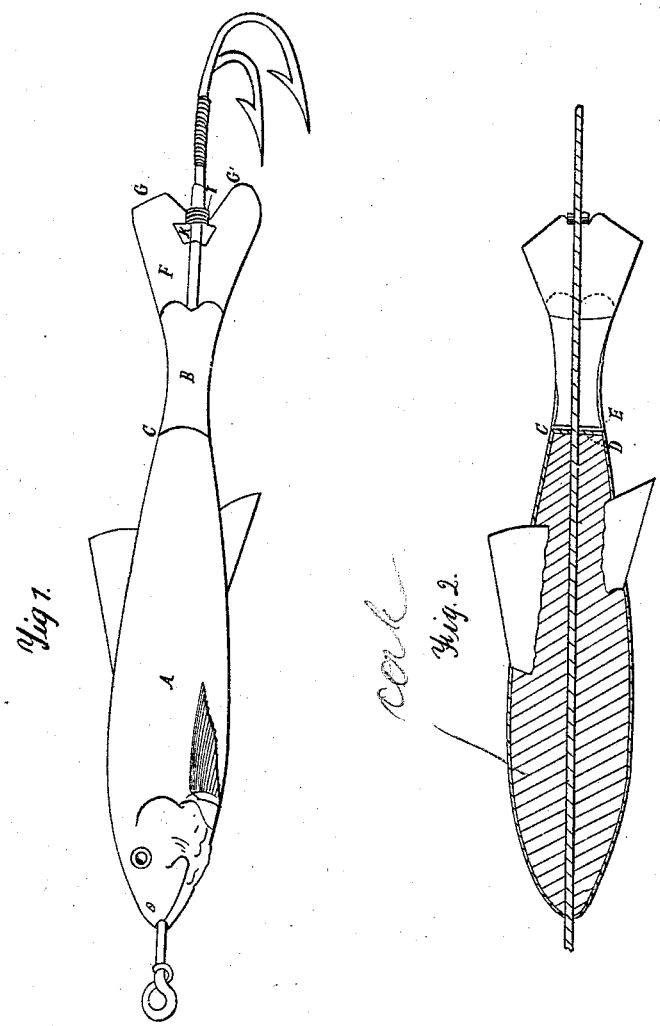
Witnesses:
Wm. J. Ford
J. H. Single
Inventor:
RILEY HASKELL

UNITED STATES PATENT OFFICE.

RILEY HASKELL, OF PAINESVILLE, OHIO.

TROLLING - BAIT FOR CATCHING FISH.

Specification forming part of Letters Patent No. 25,507, dated September 20, 1859.

*To all whom it may concern:*

Be it known that I, RILEY HASKELL, of Painesville, in the county of Lake and State of Ohio, have invented a new and Improved Trolling-Bait for Catching Fish; and I do hereby declare that the following is a full and exact description thereof, reference being had to the accompany drawings, and to the letters of reference marked thereon.

The nature of my invention consists in forming a bait for trolling purposes constructed to resemble a natural fish, a portion of the body of which is made to revolve on a shaft which passes through the other portion thereof, which portion is fixed or stationary on said shaft, while the revolving portion spins as the bait is drawn through the water or is acted on by the current; also, by so filling the inside of the said fixed portion with heavy and light substances as to enable it to keep in a vertical position in the water while trolling.

To enable others skilled in the art to make and use my invention, I will proceed to describe its construction and operation.

Figure 1 is a drawing of the whole bait as it appears when ready for use, and Fig. 2 is a longitudinal section of the same.

A, Fig. 1, is the stationary portion, and B the revolving or spinning part. The first is constructed of two concave or hollow pieces of thin sheet metal of the shape indicated by the drawings, the edges being fitted so as to be soldered, as will be explained. At the division C is a head, D, Fig. 2, which closes the end of this portion. The other portion, B, is similarly constructed, and shaped as delineated. The end of this is also closed with a head, E, Fig. 2.

F represents the thin or membranous portion of the tail, also of thin sheet metal, and is formed to correspond with the natural tail, the forks of which are bent in contrary directions, as shown at G and G'. The center of said tail-piece is grooved to receive the shaft H. Said shaft is of sufficient length to extend beyond the parts representing the head and tail of the fish for the purpose of attaching the line and securing hooks. Near the end, and in contact with the tail-piece, is formed a shoulder, I.

In putting the above-described parts together the upper portion of the fixed part A is filled with cork, and the lower portion with lead, leaving a passage through them for the shaft H. The back and belly fins are put between the two parts and the whole soldered together. The head D (through the center of which is a hole) is also soldered on. The other portion of the body, B, is similarly put together, (the thin part of the tail being previously inserted,) excepting that it has no filling, but is left hollow. The head E is also provided with a hole through its center. The shaft H is now put through the part B, (having first placed thereon two or three thin washers,) and is confined thereto by the strap K. The remaining portion of the shaft is passed into the part A and soldered to the end, forming the mouth of the fish, where it terminates in a loop or eye for attaching the line. To the opposite end of said shaft can be secured, by soldering, tying with wire, or otherwise, a suitable number of hooks.

It is recommended, when the bait is made of sheet metal, such as copper, to place the article in a silvering-bath, which will give it an attractive appearance, and will also add much to its durability.

The above mode of construction is intended for a metallic article; but it can be made of india-rubber, gutta-percha, wood, &c. In each case the kind of material employed will suggest the way of its construction.

In using the above-described trolling-bait the operation is apparent, as, when it is drawn through the water, or lying in a current, the loose portion of the bait will revolve, while the other portion remains fixed and in a vertical position, thereby insuring a more perfect and deceptive bait than has been hitherto used.

I am aware that spinning contrivances, as well as artificial forms of fish, have long been in common use. Neither of these, therefore, do I lay claim to; but What I do claim, and desire to secure by Letters Patent, is the following:

1. Constructing the body of an artificial representation of a natural fish in two detached parts, to be used in combination, one portion thereof revolving and the other remaining fixed or stationary, both portions being on one shaft, as herein particularly described, and for the purpose set forth.

2. In connection with my first claim, filling the upper part of said fixed portion with a light substance and weighting the lower part thereof, for the purpose of keeping the said fixed portion vertical in the water, as described.

RILEY HASKELL.

Witnesses:
WM. I. FORD,
J. F. SINGLE.